United States Patent
Weberhofer

[11] Patent Number: 6,014,384
[45] Date of Patent: Jan. 11, 2000

[54] METHOD FOR CONTROLLING DATA TRAFFIC IN AN ATM NETWORK

[75] Inventor: Daniel Weberhofer, Liebefeld, Switzerland

[73] Assignee: Ascom Tech AG, Bern, Switzerland

[21] Appl. No.: 08/958,366

[22] Filed: Oct. 27, 1997

[30] Foreign Application Priority Data

Oct. 29, 1996 [CH] Switzerland ............... 2665/96

[51] Int. Cl.$^7$ .......... H04L 12/42; H04L 12/28; H04L 12/56; G08C 15/00
[52] U.S. Cl. .......... 370/455; 370/230; 370/236; 370/412; 370/416; 370/468; 370/395
[58] Field of Search .................. 370/230, 236, 370/412, 416, 468, 395, 235, 252, 253, 455, 231; 395/200.57, 200.55

[56] References Cited

U.S. PATENT DOCUMENTS

| | | | |
|---|---|---|---|
| 5,295,135 | 3/1994 | Kammerl . | |
| 5,339,332 | 8/1994 | Kammerl . | |
| 5,388,097 | 2/1995 | Baugher ................... | 370/455 |
| 5,418,777 | 5/1995 | Worster . | |
| 5,448,567 | 9/1995 | Dighe et al. . | |
| 5,475,682 | 12/1995 | Choudhury et al. . | |
| 5,581,703 | 12/1996 | Baugher ................... | 395/200.55 |
| 5,634,006 | 5/1997 | Baugher ................... | 395/200.58 |
| 5,694,548 | 12/1997 | Baugher ................... | 395/200.57 |
| 5,701,465 | 12/1997 | Baugher ................... | 370/231 |

FOREIGN PATENT DOCUMENTS

| | | |
|---|---|---|
| 0774848A2 | 5/1997 | European Pat. Off. . |
| 2305576A | 4/1997 | United Kingdom . |
| WO9532570 | 11/1995 | WIPO . |
| WO9717786 | 5/1997 | WIPO . |

*Primary Examiner*—Hassan Kizou
*Assistant Examiner*—John Pezzlo

[57] ABSTRACT

For controlling the data traffic in an ATM network, in which a number of nodes are connected via a closed loop, and in which each node may be equipped with a number of access ports for sending and receiving ATM cells, the ATM cells are processed separately in each node based upon their assignment to a QoS (quality of service) class in a predefined QoS classification. In each access port, each QoS class is assigned a separate queue. The data traffic in the closed loop is monitored separately, based upon QoS class, by a cell monitor. If a performance characteristic of a QoS class is not fulfilled in the closed loop, then at least one back-pressure signal will be generated, which will serve to suppress at least one assigned queue of the access port. The monitoring of the data traffic can be implemented via a leaky-bucket system.

10 Claims, 1 Drawing Sheet

METHOD FOR CONTROLLING DATA TRAFFIC IN AN ATM NETWORK

BACKGROUND OF THE INVENTION

1. Field of the Invention

The invention involves a method and a device for controlling the data traffic in an ATM network, wherein a number of nodes are connected via a closed loop, and wherein each node may be equipped with a number of access ports for the sending and receiving of ATM cells.

2. Description of the Background Art

In a network that operates based upon packet-oriented data transmission among several nodes, traffic management is of central importance. In an ATM system (ATM= asynchronous transfer mode) having a loop-type structure, this need for control of data traffic generally results in the sum of all the band widths of all the system connections (access ports) being greater than the band width of the closed loop.

One example of this is an ATM network, known in the art from U.S. Pat. No. 5,475,682, in which the ATM cells that are received in one node are distributed, based upon their destination, to various output queues, from which they are then transmitted. The nodes can signal an overload situation to the nodes up the line using so-called back-pressure signals. In the nodes up the line, the data packets intended for the signaling nodes are then temporarily stored in a buffer. If the buffer is full, the data packets are transmitted to the nodes down the line anyway. There, in an overload situation, packets having the longest burst are shifted out of memory and are lost. The object of the method in the invention is to prevent one node from blocking all preceding nodes.

Because the data are generally received irregularly, it may be important to determine and to monitor statistically the size of the bursts. To implement this monitoring function, various leaky-bucket systems are known in the art (comp. for example U.S. Pat. Nos. 5,448,567; 5,295,135; 5,339,332, and 5,418,777.

As is known, one important advantage of ATM systems is that the widest variety of services can be provided via one and the same network. So the key is to design the traffic management system such that the various specifications (maximum permissible delay, cell loss rate, band width, etc.) will also be met or fulfilled. It is particularly important to prevent one service of lower priority from interfering with, or even blocking, one of higher priority.

SUMMARY OF THE INVENTION

An object of the invention is to provide a method of the type and a device that will support packet-oriented data traffic with variously defined data transmission services.

These and other objects are fulfilled by a method of controlling data traffic in an ATM network including plural nodes connected via a closed loop, each node being equipped with a number of access ports for sending and receiving ATM cells, including the steps in each node, processing the ATM cells of different QoS classifications separately based on a stipulated QoS classification;

for each access port, establishing a separate queue for each classification of the QoS;

in each node, monitoring the data traffic in the closed loop by means of a cell monitor separately for each classification of QoS; and in each node, generating back-pressure signals for one or more queues of the node in order to suppress an insert data stream if a performance characteristic of a QoS classification is not fulfilled.

In accordance with the invention, the ATM cells in each node are processed separately based upon their assignment to a QoS class in a predefined QoS classification. For each access port, each QoS class is assigned its own queue. With a cell monitor, the data traffic on the closed loop is separately monitored according to QoS classes. If a performance characteristic of a QoS class on the closed loop is not fulfilled, then at least one back-pressure signal is generated, which serves to suppress at least one assigned queue of the access port.

Contrary to the prior art, the ATM cells are not all treated equally. Instead, they are classified based upon the various specifications of the services in the network. The idea is for the classification of the ATM cells to be ascertained in each node. On one hand, the ATM cells to be transmitted are sent in advance to the proper queue based upon the class to which they are assigned. On the other hand, the cells passing through (transit traffic) are detected and statistically registered.

One important characterizing feature of the invention is the generation of back-pressure signals that are directed at individual, specific queues. This prevents an undifferentiated suppression of the insert data traffic. Finally, a further advantage of the invention consists in that the transit traffic can be processed at high speed, and at minimal expense in terms of circuit logic. This, in turn, enables the use of optical or optoelectronic circuit elements.

Preferably, the insert data traffic is also monitored separately based upon QoS classes. In this manner, the requirements of the different nodes can be determined, allowing the system to be selectively configured or adapted such that specific band widths can be reserved.

For identifying and controlling the data traffic, a leaky-bucket system can be implemented. In such a system, although definite upper and lower limits are specified, these can be temporarily exceeded or undercut by a certain amount.

The back-pressure signals can be used as is to suppress the appropriate queues. This means that a certain queue will no longer be serviced if a back-pressure signal is present for that queue. High-level QoS classes can thus be granted an absolute or strict priority over those of lesser value.

Of course, more precisely gradated queue-servicing systems are also possible. If, for example, based upon a certain overload situation, several back-pressure signals are generated at the same time, so that the corresponding queues are no longer being serviced at all, then a so-called "starving out" can occur. In order to prevent this, the back-pressure signals can be processed using, for example, an arbiter, such that the queues of lower priority are nevertheless serviced from time to time.

In order to enable monitoring of the data traffic and the available band widths, a control center (or very generally a resource manager) may be connected to the network. The data received locally via the data traffic and the insert data stream are preferably periodically or sporadically transmitted to this control center, which then calculates suitable parameters (such as leaky-bucket parameter values) for each node, thus enabling an optimization of the transmission efficiency of the entire system for the various QoS classes. It should be emphasized that the control center is not involved in real-time traffic management. It serves only to find the optimal system parameters (using long-term statistics), and to monitor the allocation of the band widths. It is not necessary to implement the functioning of the control center in a physically separate server. Also, a corresponding network function can be implemented in individual nodes or in all the nodes.

In accordance with one preferred embodiment of the invention, at least the band width and the burst size are measured and monitored separately for each QoS class, at the output ends of the nodes. Of course, additional relevant parameters may also be identified.

In order to permit the most rapid and most efficient possible processing of the ATM cells, the cells are provided or supplemented, upon entry into the network (that is, at the access port), with a class-specific identifier. Prior to exiting the transmission system, the identifier is removed, so that the user sees nothing of this measure.

The circuit logic conversion of the method can be effected using known in the art elements. The closed loop is preferably an optical fiber (optical-fiber cable). The demultiplexers and multiplexers (input and output side of the node) are implemented as electronic circuits. However, there is nothing to prevent a scaling of the transmission rate as above, using optical multiplexers/demultiplexers.

From the following detailed specification, and from the totality of the patent claims, further advantageous embodiments and combinations of characteristic features of the invention are revealed.

BRIEF DESCRIPTION OF THE DRAWINGS

The present invention will become more fully understood from the detailed description given hereinbelow and the accompanying drawings which are given by way of illustration only, and thus, are not limitative of the present invention and wherein.

DETAILED DESCRIPTION OF THE PREFERRED EMBODIMENTS

Figure 1:
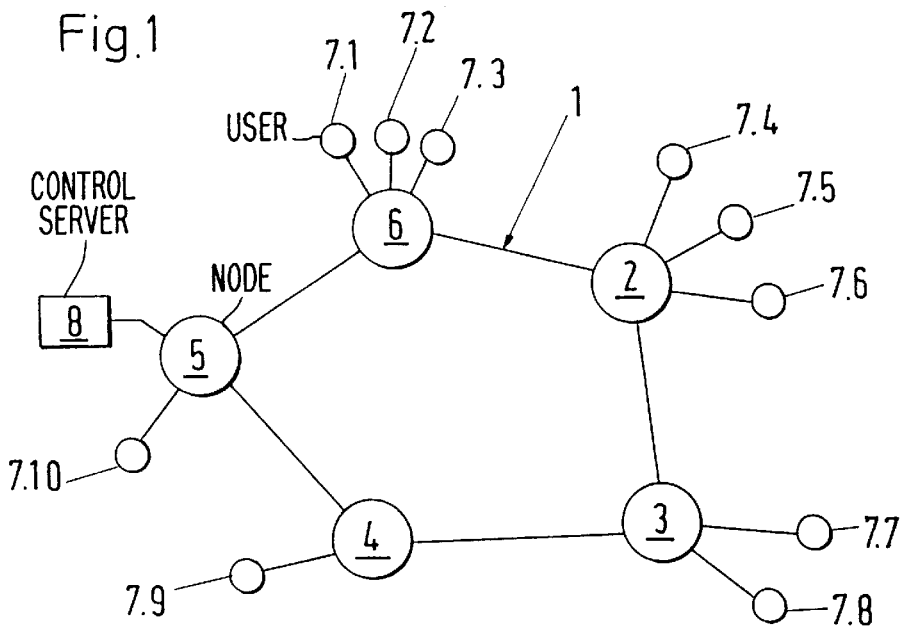
FIG. 1 illustrates a schematic representation of a network.

The present exemplary embodiment is based upon a network structure such as is illustrated in FIG. 1. A number of nodes 2, . . . , 6 are connected to one another via a closed loop 1 (such as a fiber optic cable). Users 7.1, . . . , 7.10 can be connected when necessary to each node 2, . . . , 6 via access ports. Each user 7.1, . . . , 7.10 can transfer data to any other user. This data may include (digitized) voice signals, video signals, control commands for machines or production facilities, or data files. The direction of the flow of data in the closed loop 1 can, for example, be firmly stipulated (for example in a clockwise direction).

According to a preferred embodiment of the invention, a control center (server) 8 is included for the purpose of optimizing the traffic management. This server can be connected to any node 5. It receives information from the nodes 2, . . . , 6 on the data traffic (for example at the start of the establishment of a connection) and prepares a system configuration based upon the long-term statistics received. It stipulates to the nodes 2, . . . , 6 the parameter values on the band widths to be reserved for the different QoS classes and/or the expected burst sizes.

Figure 2:
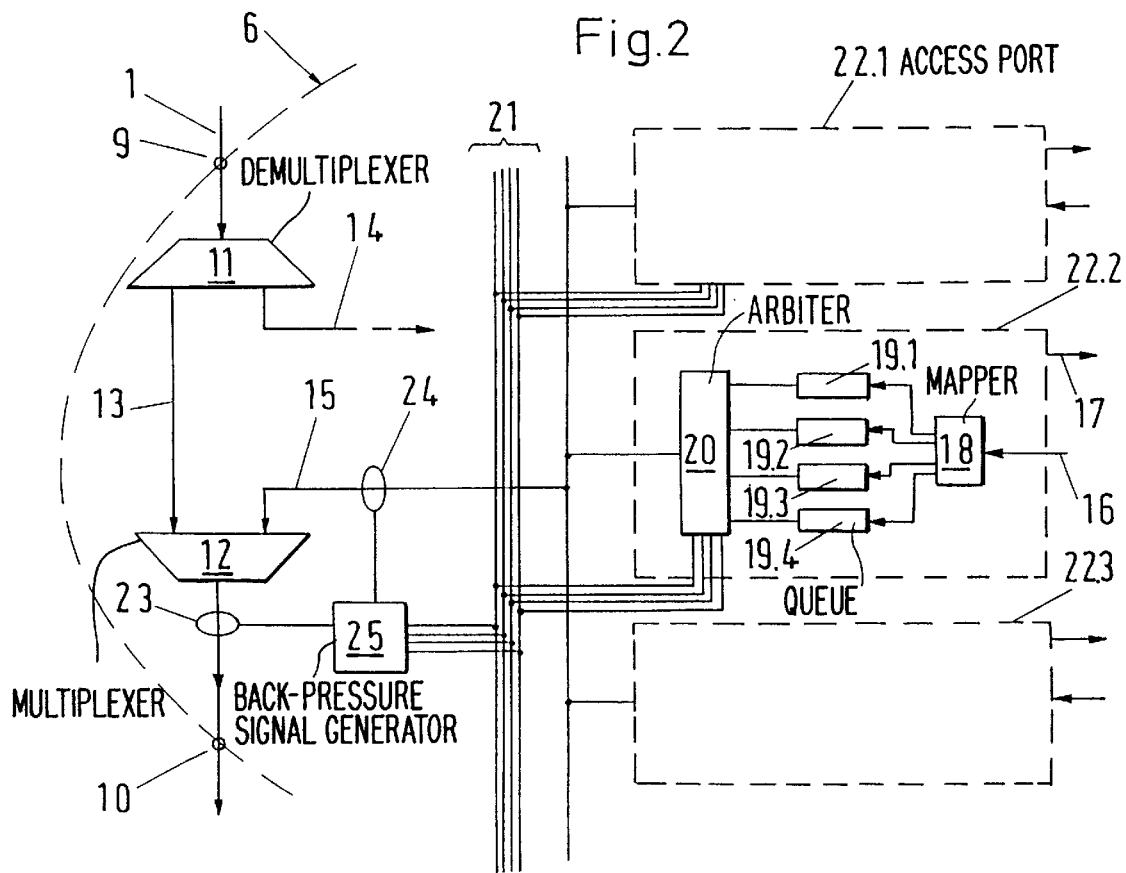
FIG. 2 illustrates a block diagram that details preferred embodiments of in the invention. Generally, components are indicated using the same numbers in both figures.

FIG. 2 shows a sectional block diagram of the node 6. At the input point 9, the closed loop 1 is directed to a demultiplexer 11, which extracts (extract-line 14) those ATM cells that are destined for a user on the node 6. All other ATM cells are sent directly to the multiplexer 12 via a transit line 13. The multiplexer combines the insert data stream (insert line 15) with the transit stream and transmits it via the output point to the next node.

The extraction of the ATM cells is not relevant to the present context. For this reason, the extract-line 14 is drawn only in outlines, and the intermediate storage elements or queues are omitted. What is of importance, in contrast, are the monitoring and control of the insert data stream. This stream contains ATM cells that may differ in terms of the transmission standard to be met. Below, a number of QoS classes (QoS=quality of service) will be characterized as an example.

CBR category: For certain applications, for example, it is important that for the duration of the communication connection, a very specific band width be held perpetually open. The magnitude of the band width can be characterized by a specific PCR value (PCR=peak cell rate). In order to be able to offer such a service, the network must hold open or reserve a corresponding band width for the duration of the connection. Further CBR parameters include, for example, cell delay (CD) and cell delay variation (CDV).

Rt-VBR-category: Further, for example, a category for real-time applications with variable bit rates can be defined. In this category, a narrow tolerance for the maximum delay variation (CDV) in the transmission of the cells is required. In addition, for example, a maximum burst size (MBS) and a PCR value are defined.

UBR category: For file transfer and similar communications, it is not necessary to require a high standard of transmission quality, since neither delays nor data losses will result in an unrecoverable error.

Further details may be found in the document ATM FORUM Traffic Management Specification 4.0, AF-95-0013, R13, April 96.

In accordance with the invention, within the network, the processing of the ATM cells is distributed based upon their assignment to one of the QoS classes. This is described in greater detail below, with reference to FIG. 2.

Node 6, for example, comprises three access ports 22.1 through 22.3, all of which are of the same design. Below, the key functions and components are described with reference to access port 22.2. This port is equipped with a data input point 16 and a data output point 17 for the ATM cells. The ATM cells to be transmitted are first identified using a mapper 18. This mapper determines which QoS class a cell belongs to, and directs it to the proper queue 19.1 through 19.4. ATM cells of higher transmission priority are thus separated from those of lower transmission priority. The length of the queues 19.1 through 19.4 is coordinated to the maximum (or average) burst size of the corresponding transmission service.

On the output side, the queues 19.1 through 19.4 are serviced by an arbiter. In other words, the arbiter determines which of the queues 19.1 through 19.4 are to be emptied via the insert line 15 and the multiplexer 12 into the closed loop. As long as there is sufficient transfer capacity in the closed loop 1, the insertion of the data into the transit data stream presents no problem. If, however, the transit data stream is temporarily too large to permit the pending insert data quantity to be completely processed, there must be some control of the data traffic. The details of this process are accomplished in accordance with the invention as follows.

First, the data traffic must be monitored. To this end, at the output end of the multiplexer 12 and on the insert line 15 data monitors 23, 24, respectively, are positioned. These monitors register the QoS classes of the transit ATM cells and determine the band width being used, the burst size of the data transfer, and if necessary, additional parameters. A mapper may be used to assign QoS classes to ATM cells, which determines the class, based upon the data contained in the cell header and upon an allocation table. It is, however, also possible to append a special marking in the header of the cell (for example during its transit through the mapper 18), thus simplifying and accelerating the class identification of the ATM cells in the data monitors 23, 24.

A back-pressure generator 25 evaluates the data supplied by the data monitors 23, 24, in order to permit the selective braking of the data insert via the back-pressure lines 21. The object of the evaluation is to determine in which QoS class the predefined values (configuration values) are being exceeded, and thus which queues are to be suppressed.

For measuring or monitoring the data traffic, the network may include one leaky-bucket system per QoS class. Such a system encompasses, in principle, a counter which on the one hand is incremented with each registered ATM cell, and on the other hand, each time after a certain time interval, is set back by a certain value. A variety of leaky-bucket systems are known in the art as described in the Background Art section of the specification. It would thus be superfluous to go into any further detail at this point.

It is important that in the framework of the invention, a separate back-pressure signal is generated for every queue 19.1, . . . , 19.4. However, the back-pressure signal for the queue 19.1, for example, controls not only the specified queue of the access port 22.2, but all equivalent queues of all access ports 22.1, . . . , 22.3.

Each access port 22.1, . . . , 22.3 is equipped with an arbiter 20 which serves the queues 19.1, . . . , 19.4 in accordance with a preset scheme and dependent upon the signals present at the back-pressure lines 21.

In the simplest case, the servicing of those queues for which a back-pressure signal is present is halted. If, for example, it is determined by the data monitor 23 that the ATM cells of the UBR category present in the loop fill up the stipulated or permissible band widths given in the configuration, or even exceed these widths, then a back-pressure signal is generated for the corresponding queue, so that ATM cells of this category are not allowed entry into the insert data stream.

It is also possible to suppress all queues whose QoS class is of lower priority than those whose quality characteristics are in danger of being violated. If, for example, the ATM cells of the highest category (CBR) exceed the stipulated boundary values, then, for example, all other categories may be temporarily suppressed.

It is not necessary for the arbiter 20 to be organized on a rigid priority basis. In other words, even if it receives a back-pressure signal for the queue 19.3 it need not necessarily halt this queue. It is possible, for example, for it to service the queue in question 19.3 much less often (for example ten times less often) than under normal conditions. It is also possible to define a so-called controlling counter, that would be activated every time several back-pressure signals are generated simultaneously, and would be directed to one of the queues to be suppressed. The queue identified in this manner is serviced on a decreased scale, while the remaining queues having backpressure signals are not serviced at all. From time to time the controlling counter is directed at one of the completely suppressed queues. As a result of this, the queue will be no longer serviced, while the others are serviced to a limited extent. In this manner, the suppressed queues can be successively and if necessary cyclically processed. A complete blocking of any service by a higher-priority service, based upon network load, can thus be prevented.

With the optional control center 8, the system configuration can be altered to meet the requirements that change over the course of time. Because the nodes 2, . . . , 6 collect statistical information on the local data traffic, and transfer this information to the control center 8, the band widths, for example, can be reconfigured or redistributed there. The control center specifies the new system configuration to the nodes 2, . . . , 6 every few seconds, for example.

In conclusion, it is possible with the traffic management system specified in the invention to produce a multitude of different transfer services, such that even in the case of increased load on the network, the services of lower priority cannot block those of higher priority. An important advantage of the invention consists in that no central access protocol (media access protocol) is necessary. The transfer rate in the loop can thus be more easily scaled upward in the range of several Gbit/s.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A method of controlling data traffic in an ATM network including plural nodes connected via a closed loop, each node being equipped with a number of access ports for sending and receiving ATM cells, the method comprising the steps of:

a) in each node, processing ATM cells of different QoS classification separately based on stipulated QoS classification;

b) for each access port, establishing a separate queue for each classification of QoS;

c) in each node, monitoring the data traffic in the closed loop by means of a cell monitor separately for each classification of QoS; and d) in each node, generating back-pressure signals for one or more of queues of the node in order to suppress an insert data stream if a performance characteristic of a QoS classification is not fulfilled.

2. The method in accordance with claim 1, wherein in each node, the insert data stream is monitored by a cell monitor.

3. The method in accordance with claim 1, wherein monitoring is effected based upon a leaky-bucket principle.

4. The method in accordance with claim 1, wherein the back-pressure signals are generated based upon a strict priorities scheme of QoS classes.

5. The method in accordance with claim 1, wherein the back-pressure signals are converted in a queue-servicing scheme via an arbiter, such that even when a certain queue has received a back-pressure signal, the certain queue will be serviced at least sporadically.

6. The method in accordance with claim 1, wherein in each node, a band width in use and a burst size for each QoS class are separately measured and compared locally with a preset value.

7. The method in accordance with claim 1, wherein the ATM cells are supplemented with an additional marking at an input side of the access ports, providing rapid classification of the ATM cells by the cell monitors.

8. The method in accordance with claim 1, wherein statistical data regarding circulating and insert data traffic are collected in the nodes and the collected data are sporadically sent to a control center, the control center correspondingly adapting system configuration and sending new configuration values to the nodes.

9. A node configuration for an ATM network, comprising:

a demultiplexer/multiplexer for extracting and inserting ATM cells out of and into the ATM network;

at least one access port having several queues for the intermediate storage of ATM cells to be transmitted, wherein ATM cells to be inserted belong to QoS classes and are separated based upon corresponding QoS class;

at least one cell monitor for monitoring a data stream on the ATM network; and a back-pressure generator for generating a back-pressure signal, based upon the monitored data stream and specifically for one or several queues, for suppressing insertion of ATM cells into the ATM network.

10. The node configuration in accordance with claim 9, further comprising an arbiter with a queue-servicing scheme, for reading out ATM cells from the queues dependent upon the presence of back-pressure signals.

* * * * *